US005374379A

United States Patent [19]

Tsubokawa et al.

[11] Patent Number: 5,374,379

[45] Date of Patent: Dec. 20, 1994

[54] PTC COMPOSITION AND MANUFACTURING METHOD THEREOR

[75] Inventors: Norio Tsubokawa, Niigata; Naoki Yamazaki, Tokyo, both of Japan

[73] Assignee: Daito Commuication Apparatus Co., Ltd., Tokyo, Japan

[21] Appl. No.: 944,974

[22] Filed: Sep. 15, 1992

[30] Foreign Application Priority Data

Sep. 26, 1991 [JP] Japan ................................. 3-247706

[51] Int. Cl.[5] ........................... C08K 3/04; C08K 3/08

[52] U.S. Cl. .................................... 252/511; 252/512; 524/113; 524/495; 524/543; 524/563; 522/75; 522/153; 522/154

[58] Field of Search ................... 522/83, 71, 113, 134, 522/75, 153, 154; 525/326.1; 524/113, 495, 543, 563; 252/511, 512

[56] References Cited

U.S. PATENT DOCUMENTS 4,188,276 2/1980 Lyons et al. .......................... 522/71
4,525,297 6/1985 Yamane et al. ....................... 522/71
4,534,889 8/1985 von Konynenburg et al. ...... 522/71
4,545,926 10/1985 Fouts, Jr. et al. ................... 252/511
4,560,498 12/1985 Horsma et al. ...................... 252/511
4,658,121 4/1987 Horsma et al. ...................... 252/511
4,775,500 10/1988 Funakoshi et al. ................... 522/71
4,775,778 10/1988 von Konynenburg et al. ...... 522/71
5,190,697 3/1993 Ohkita et al. ....................... 252/511
5,280,263 1/1994 Sugaya .............................. 338/22 R

*Primary Examiner*—Susan W. Berman
*Attorney, Agent, or Firm*—Vineet Kohli; Thomas R. Morrison

[57] ABSTRACT

A method for making a PTC element grafts a crystalline polymer to conductive particles to form a PTC composition. The step of grafting including solution polymerization. The PTC composition is formed into a PTC element. The PTC element is cross-linked after forming. The PTC element according to this invention exhibits superior PTC behavior when the temperature of the PTC element reaches the crystal melting point of the crystalline polymer.

4 Claims, 3 Drawing Sheets

PTC COMPOSITION AND MANUFACTURING METHOD THEREOR

BACKGROUND OF THE INVENTION

The present invention relates to a PTC (positive temperature coefficient) composition which comprises a thick-film type PTC element.

Conventional thick-film type PTC elements are usually formed from polymers and have conductive particles dispersed in the polymer. The types of polymers used include non-crystalline vinyl polymers, side-chain crystalline vinyl polymers, and crystalline polymers with high melting points.

These conventional PTC elements resemble the one shown in FIG. 1. In FIG. 1, the PTC element body 3 is formed on substrate 2 with a pair of electrodes 1 affixed thereto. A lead wire terminal 4 is connected to each electrode.

A PTC element increases its resistance as the temperature rises. Referring to FIG. 4, as temperature T rises to the glass-transition temperature (Tg) of the polymer material of which the PTC element is made, the resistance of the PTC element gradually increases. The increase in resistance occurs because as the temperature rises, the polymer in the PTC element experiences micro-Brownian motion. The resulting expansion of the polymer tends to separate the conductive particles. The separation of the conductive particles produces a proportionate increase in resistivity. When the temperature reaches the glass-transition temperature, the polymer begins to undergo inter-molecular motion which considerably increases the volume of the polymer. This increases the distance between the conductive particles present in the polymer and results in a sharp increase in the resistance.

In the prior art, a non-crystalline vinyl polymer has been used in the PTC composition. In this case, the PTC composition is formed by first grafting the non-crystalline polymer to the surfaces of carbon black particles by solution polymerization. Next, cross-linking occurs by adding an epoxy resin as a cross-linking agent. The composition is then heated and made into a thick film. The resulting composition is a non-crystalline vinyl polymer PTC composition.

The prior art also discloses the use of side-chain crystalline vinyl polymers to form the PTC composition. The use of this polymer is disclosed in A New Composite Register With PTC Anomaly (J. Polymer Sci. 19. 1871 (1981) by K. Ohkita, et al). It requires that carbon black particles be dispersed in a side-chain crystalline vinyl polymer in solution to form the PTC composition.

A still additional polymer that has been used in the prior art to form PTC compositions is a crystalline polymer with a high melting point. The specific type of crystalline polymer usually used is polyethylene. The PTC composition is formed by grafting the crystalline polymer to the surfaces of carbon black particles by thermal mixing.

There are problems in the prior art when side-chain crystalline vinyl polymer is used to form the PTC composition. The carbon black particles are not thoroughly dispersed in the side-chain crystalline vinyl polymer because the polymer is not grafted to the surfaces of the carbon black particles. This results in widely varying resistance values inside the PTC element body. Varying resistance values result in varying temperature rises, including localized hot spots.

To avoid the problems above, non-crystalline vinyl polymer is normally used in the PTC composition to form a thick-film type PTC element.

The ideal PTC element exhibits a constant device temperature response, steep cut-off current characteristics, and large current limiting function at the polymer's glass transition temperature (Tg). These results are obtained where there is a large rate of increase of resistance and a steep rise in resistance at the initiation of PTC behavior.

Prior thick-film PTC compositions of non-crystalline vinyl polymer have not exhibited the ideal characteristics outlined above. Instead, their PTC behavior is exhibited at the glass transition temperature (Tg) of the cured non-crystalline vinyl polymer. As a result, the rate of increase of resistance is small and the rise in resistance at the initiation of PTC behavior is gradual. Additionally, the PTC composition has a large value of resistance which makes miniaturization difficult.

OBJECTS AND SUMMARY OF THE INVENTION

Accordingly, it is an object of the invention to provide a thick-film PTC composition which overcomes the drawbacks of the prior art.

It is a further object of the invention to provide a thick-film PTC composition which exhibits a large rate of increase of resistance and a steep rise in resistance at the initiation of PTC behavior.

It is a still further object of the invention to provide a thick-film PTC composition which is easily miniaturized.

Briefly stated, the present invention provides a method for making a PTC element by grafting a crystalline polymer to conductive particles to form a PTC composition. The step of grafting includes solution polymerization. The PTC composition is formed into a PTC element. The PTC element is cross-linked after forming. The PTC element according to this invention exhibits superior PTC behavior when the temperature of the PTC element reaches the crystal melting point of the crystalline polymer.

According to an embodiment of the invention, there is provided a method for making a PTC element comprising: grafting a crystalline polymer to conductive particles to form a PTC composition, the step of grafting including solution polymerization, forming the PTC composition into a PTC element, and cross-linking the crystalline polymer in the PTC element.

The above and other objects and advantages of the present invention will become apparent from the following description read in conjunction with the accompanying drawings, in which like reference numerals designate the same element.

DETAILED DESCRIPTION OF THE PREFERRED EMBODIMENT

Figure 1:
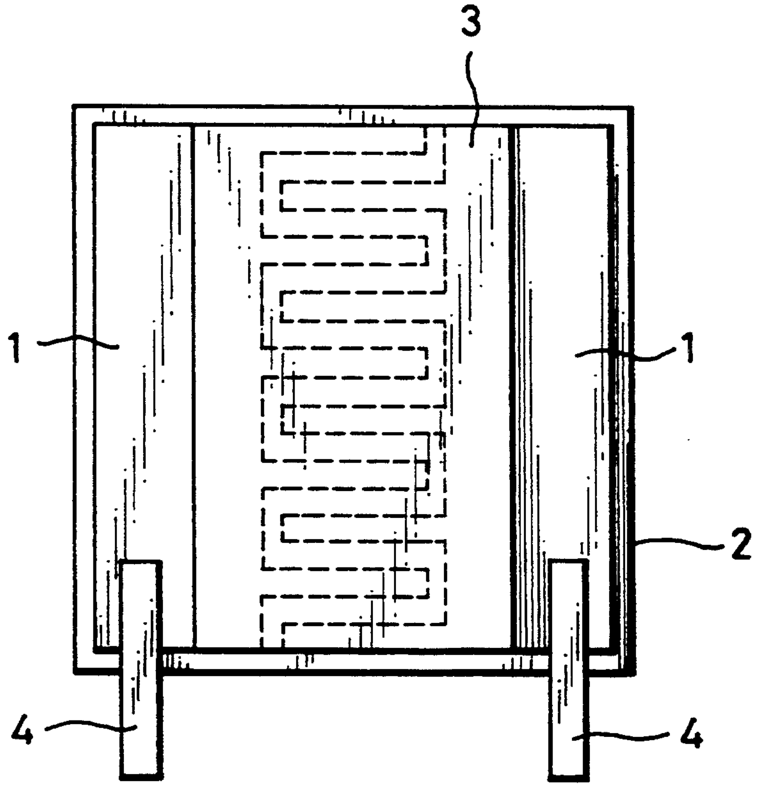
FIG. 1 is a top view of an embodiment of a PTC element formed from the PTC composition made according to the present invention.
Figure 2:
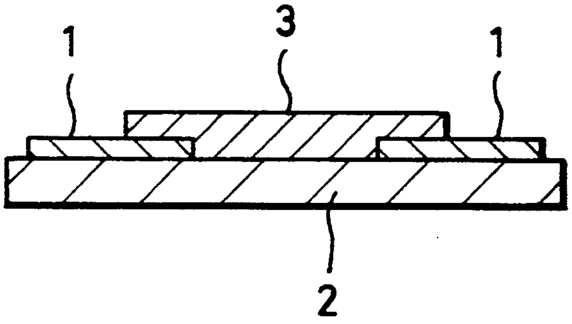
FIG. 2 is a rear elevation of the invention of FIG. 1.

A PTC composition for forming a PTC element used for overcurrent protection, according to this invention has its crystalline polymer grafted to conductive particles by solution polymerization. The crystalline polymer according to this invention has functional groups in at least one location which may be at either end of the polymer molecule and/or inside of the polymer molecule. The product thus obtained is cross-linked by radiation induced cross-linking and/or chemicals cross-linking using a cross-linking agent. The cross-linking agent is one having functional groups which chemically bond with the functional groups of the crystalline polymer.

The PTC element formed from the PTC composition according to this invention exhibits PTC behavior when its temperature reaches the crystal melting point of the crystalline polymer contained therein. The volume of the PTC element formed from the PTC composition according to this invention increases when the temperature of the PTC element reaches the crystal melting point of its crystalline polymer. This increase in volume is greater than the increase in volume of non-crystalline polymer at its glass-transition temperature. Accordingly, the rise in the PTC characteristics of the invention is more drastic and its PTC characteristics are greater than if a non-crystalline polymer was used to form the PTC composition. An additional advantage of this invention is that fusion of the PTC element at the time its temperature exceeds the crystal melting point is avoided because the crystalline polymer is cross-linked. A still additional advantage of this invention is that the PTC composition can be printed on a substrate and made into a thick film because solution polymerization is used to produce the PTC composition.

To prepare Example 1 we used 3 g of carbon black (#60H, manufactured by Asahi Carbon Industries; hereinafter referred to as CB) as the conductive particles, 12 g of polyethylene glycol (PEG-6000, manufactured by Junsei Chemical Industries; hereinafter referred to as PEG) as the crystalline polymer, 0.56 g of azo compound (4,4 azobis-4-cyanopentanoic acid, manufactured by Wako Pure Chemical Industries, Ltd.; hereinafter referred to as ACPA) as the grafting agent, 2.06 g of N,N-dicyclohexylcarbodimide (manufactured by Junsei Chemical Industries; hereinafter referred to as DCC) as the catalyst, and 20 ml of tetrahydrofuran (manufactured by Junsei Chemical Industries; hereinafter referred to as THF) as the solvent. Solution polymerization of the above elements was accomplished by mixing them together and reacting them for 48 hours at 70° C. while being stirred.

An explanation of the process of grafting PEG on CB follows.

As shown in formula [1], PEG has crystallized —($CH_2CH_2O$)n— in its main chain and hydroxyl groups (—OH) at both ends of its main chain. The hydroxyl groups serve as functional groups.

PEG: HO—($CH_2CH_2O$)n—H [1]

Theoretically, grafting of PEG on CB proceeds in accordance with either process (1) or (2) illustrated below. In actual cases, however, it is assumed that reaction processes (1) and (2) proceed at the same time.

Process (1) ensues in cases where introduction of carboxyl groups (—COOH) onto CB has priority.

(1)

a. CB + HO—C(=O)—R—N=N—R—C(=O)—OH → (ACPA) CB—R—C(=O)—OH + .R—C(=O)—OH b. CB—R—C(=O)—OH + HO—($CH_2CH_2O$)n—H → (PEG) CB—R—C(=O)—O—($CH_2CH_2O$)n—H (DCC)

Process (2) ensues in cases where reaction between ACPA and PEG have priority.

(2)

a. HO—($CH_2CH_2O$)n—H + (PEG) HO—C(=O)—R—N=N—R—C(=O)—OH → (ACPA) HO—($CH_2CH_2O$)n—C(=O)—R—N=N—R—C(=O)—OH (DCC)

b. CB + HO—($CH_2CH_2O$)n—C(=O)—R—N=N—R—C(=O)—OH → CB—R—C(=O)—O—($CH_2CH_2O$)n—H + .R—C(=O)—OH

The crystalline polymer PEG is grafted to the surface of CB as a result of reactions (1) and (2) illustrated above.

The ratio of crystalline polymer grafted on to CB is indicated as grafting percentage. When 1 g of polymer is grafted to 1 of CB the grafting percentage is 100%.

During the reaction processes illustrated in (1) and (2) above, any polymer which had not been grafted was separated out using a Soxhlet extractor and measured. The grafting percentage was 26% for the reaction between PEG and CB.

Following solution polymerization, the reaction product was brought to room temperature and mixed with 0.075 g of hexamethylene diisocyanate (Colonate 2513, manufactured by Nippon Polyurethane Industries; hereinafter referred to as HDI) as the cross-linking agent. The mixture was then stirred.

As shown in formula [2], HDI has isocyanate groups (—N=C=O) as functional groups. The isocyanate groups are capable of chemically bonding with the hydroxyl groups of PEG.

HDI: O=C=N—($CH_2$)$_6$—N=C=O [2]

After the cross-linking agent was added the reaction product was applied on substrate 2, as shown in FIG. 1, and heated at 100° C. for 1 hour. As a result, the hydroxyl groups of PEG were chemically bonded to the isocyanate groups of the cross-linking agent. The final composition was a cross-linked structure. It had 25% CB relative to crystalline polymer.

Figure 3:
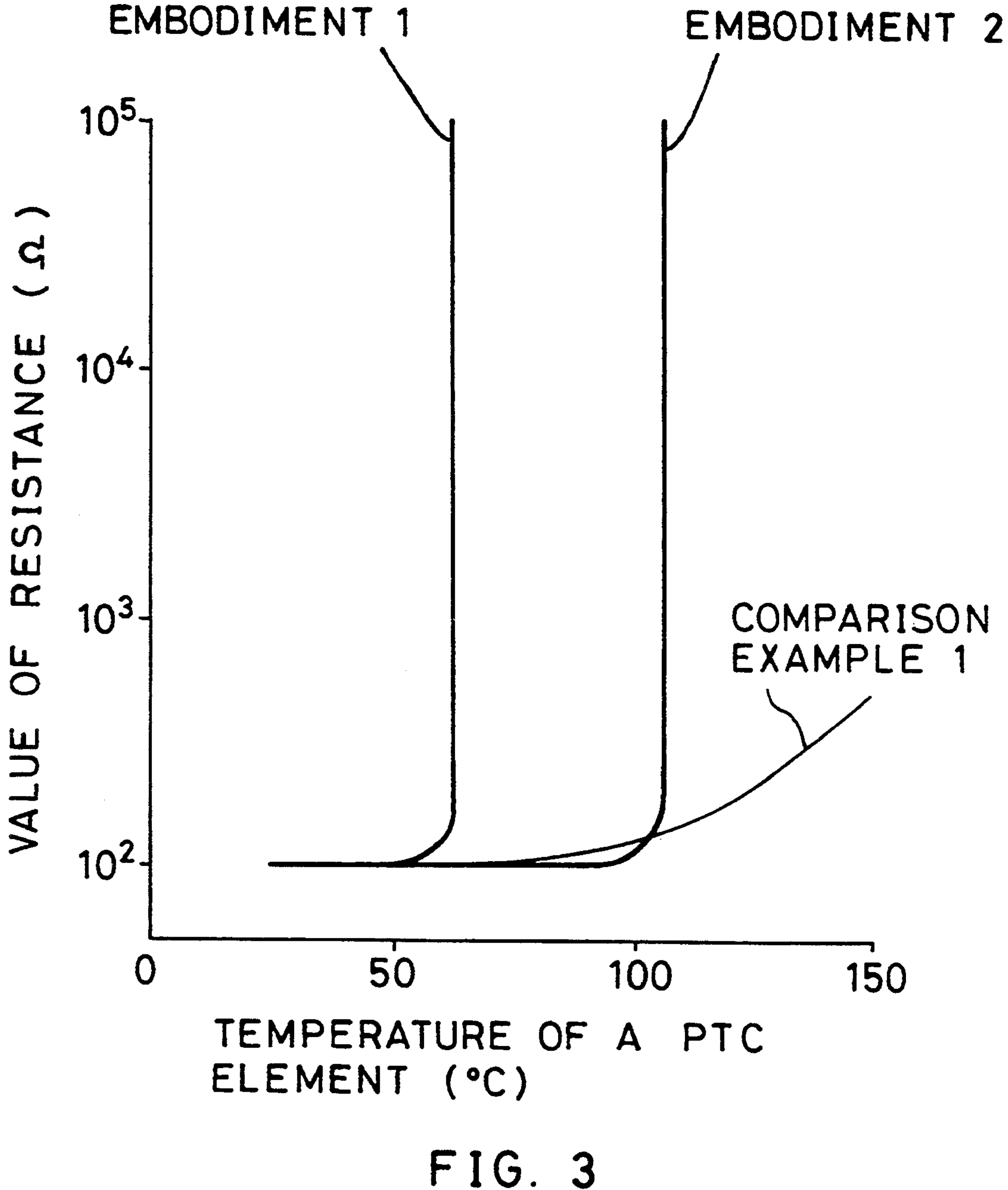
FIG. 3 is a graph of the resistance values of Examples 1 and 2 of the present invention and Comparison Example 1 as they vary with temperature.
Figure 4:
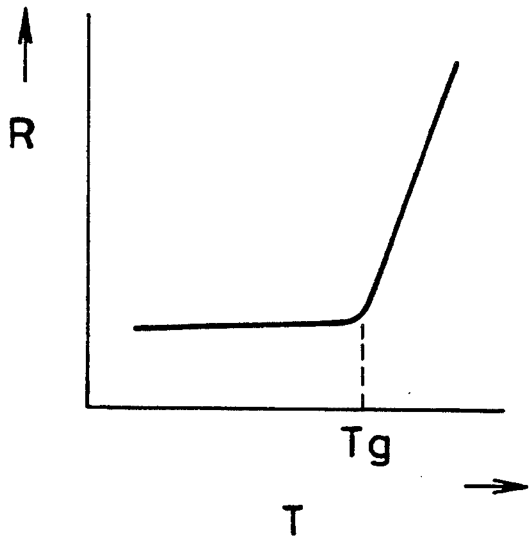
FIG. 4 is a graph of the resistance values of a conventional PTC element as it varies with temperature.

Referring to FIG. 1, PTC element 5 was formed with PTC element body 3 having a PTC composition obtained according to the procedure used to make Example 2. The value of resistance of PTC element 5 at room temperature was approximately 100 Ω. The resistance/temperature characteristics of PTC element 5 is shown in FIG. 3. The graph in FIG. 3 illustrates that the element exhibited PTC behavior at 62° C., which is the crystal melting point of PEG, and that the behavior was exhibited suddenly and drastically. The magnitude of PTC characteristics, which is the height of PTC (hereinafter referred to as Hp) was approximately 3.

Hp is calculated according to formula [3].

$$Hp=\log(R_{peak}/R_o) \quad [3]$$

$R_{peak}$: maximum resistance value $R_o$: resistance value at room temperature To prepare Example 2 we used 3 g of carbon black (#60H, manufactured by Asahi Carbon Industries; hereinafter referred to as CB) as the conductive particles, 10 g of saponificated ethylene-vinyl acetate copolymer (Dumiran R, manufactured by Takeda Chemical Industries, Ltd.; hereinafter referred to as partially saponificated EVA) as the crystalline polymer, 0.33 g of azo compound (2,2-azobis-2-cyanon-propanol, manufactured by Junsei Chemical Industries; hereinafter referred to as ACP) as the grafting agent, 0.38 g of N,N-dicyclohexylcarbodimide (manufactured by Junsei Chemical Industries; hereinafter referred to as DCC) as the catalyst, and 20 ml of tetrahydrofuran (manufactured by Junsei Chemical Industries; hereinafter referred to as THF) as the solvent.

The above elements were mixed together and reacted for 48 hours at 70° C. while being stirred.

An explanation of the process of grafting partially saponificated EVA on CB follows.

Formula [4] illustrates that partially saponificated EVA has crystallized —$(CH_2CH_2)n$— in its main chain and carboxyl and hydroxyl functional groups. The carboxyl functional groups are present at both ends of the main chain of partially saponificated EVA. The hydroxyl functional groups are present inside the partially saponificated EVA molecule.

Partially saponificated EVA:

$$HOOC-(CH_2CH_2)n-(\underset{\displaystyle OH}{CH_2CH})m-(\underset{\displaystyle OCOCH_3}{CH_2CH})l-COOH \quad [4]$$

The grafting of partially saponificated EVA particles proceeded according to the same reactions recited for Example 1. The grafting percentage was 26%.

Next, the reaction product was returned to room temperature and 0.065 g of hexamethylene diisocyanate (Colonate 2513, manufactured by Nippon Polyurethane Industries; hereinafter abbreviated as HDI) was added as a cross-linking agent, in the same manner as in Example 1, and the mixture was stirred.

After adding the cross-linking agent, the reaction product was applied on substrate 2, as shown in FIG. 1, and heated at 100° C. for 1 hour. As a result, the carboxyl and hydroxyl groups of partially saponificated EVA and the isocyanate groups of the cross-linking agent were chemically bonded.

A PTC composition having a cross-linked structure was obtained. The CB content of the obtained PTC composition in relation to the crystalline polymer containing the cross-linking agent was approximately 30%.

Referring to FIG. 1, a PTC element 5 was formed with PTC element body 3 having a PTC composition obtained according to the procedure used to make Example 2. The resistance value of PTC element 5 at room temperature was approximately 100 Ω. The resistance/temperature characteristics of PTC element 5 is shown in FIG. 3. The graph in FIG. 3 illustrates that the PTC element exhibited PTC behavior at 106° C., which is the crystal melting point of partially saponificated EVA, and that the PTC behavior was exhibited suddenly and drastically. The magnitude of the PTC characteristics (Hp) was approximately 3.

To prepare Comparison Example 1 we used 30 g of carbon black (#60H, Manufactured by Asahi Carbon Industries; hereinafter referred to as CB) as the conductive particles, 1.8 g of acrylic acid (manufactured by Junsei Chemical Industries; hereinafter referred to as AA) as the first monomer, 41.7 g of octylmethacrylate (manufactured by Junsei Chemical Industries; hereinafter referred to as OMA) as the second monomer, 1.8 g of 2,2-azobisisobutyronitrile (manufactured by Junsei Chemical Industries; hereinafter referred to as AIBN) as the polymerization initiator, 100 cc of dimethyl-formamide (manufactured by Junsei Chemical Industries; hereinafter referred to as DMF) as the first solvent, and 100 cc of methyl isobutyl ketone (manufactured by Junsei Chemical Industries; hereinafter referred to as MIBK) as the second solvent. These elements were mixed together and reacted for 8 hours at 95° C. while being stirred.

During mixing the AA and OMA formed a copolymer which was a non-crystalline polymer. The resulting non-crystalline polymer was grafted onto CB particles.

Next, the reaction product was brought to room temperature and 4.75 g of epoxy resin (Epicoat 828, manufacture by Petrochemical Shell Epoxy Industries; hereinafter referred to as EP) was added as a cross-linking agent.

After adding the cross-linking agent the reaction product was applied on a substrate that included a pair of electrodes. The assembly was heated at 70° C. for 2 hours, then at 150° C. for another 2 hours, and finally at 180° C. for 1 hour. As a result, the carboxyl groups of AA and the epoxy groups of EP were chemically bonded. The CB content of the obtained PTC composition in relation to the polymer containing the cross-linking agent was approximately 62%.

A PTC element was formed with a PTC composition obtained according to the process for making Comparison Example 1. The resistance value of this PTC element at room temperature was approximately 100 Ω. Its resistance/temperature characteristics are shown in FIG. 3. The graph in FIG. 3 indicates that the element exhibited PTC behavior at 104° C., which is the glass-transition temperature of the PTC composition. The graph in FIG. 3 also illustrates that the manner and appearance of PTC behavior was gradual. The magnitude of PTC characteristics (Hp) was approximately 0.7. The value of $R_{peak}$ was the resistance value of this PTC element at 150° C. for the purpose of calculating Hp for comparison Example 1. The resistance value was calculated by taking the heat resistance of the PTC composition into consideration.

Table 1 illustrates the rise of PTC characteristics and Hp of Examples 1 and 2, and of Comparison Example 1.

TABLE 1

| | CB content (%) | value of resistance (Ω) | rise of PTC characteristics | Hp |
|---|---|---|---|---|
| Example 1 | 25 | 100 | steep | 3 |
| Example 2 | 30 | 100 | steep | 3 |
| Comparison Example 1 | 62 | 100 | dull | 0.7 |

According to Table 1, it is evident that forming the body of the PTC element with a PTC composition containing a crystalline polymer grafted to the surfaces of conductive particles by solution polymerization which is cross-linked, produces a steep rise of PTC characteristics and a large magnitude of PTC characteristics.

The amount of CB necessary to obtain a given value of resistance is less for Examples 1 and 2 as compared with Comparison Example 1. Therefore, according to the present invention, the amount of CB required to produce the same value of resistance is reduced. Alternatively, the resistance produced by a given amount of CB is reduced.

The superior PTC characteristics of the present invention can also be obtained using crystalline polymers with higher melting points than the 62° C. and 106° C. crystalline polymer melting points present in Examples 1 and 2 respectively.

Having described preferred embodiments of the invention with reference to the accompanying drawings, it is to be understood that the invention is not limited to the precise embodiments and that various changes and modifications may be affected therein by one skilled in the art without departing from the scope or spirit of the invention which is limited only by the appended claims.

What is claimed is:

1. A method for making a PTC element comprising:

grafting in solution at least one crystalline polymer selected from the group consisting of polyethylene glycol and saponified ethylene-vinyl acetate copolymer to conductive particles to form a PTC composition, said step of grafting in solution includes combining said crystalline polymer and said conductive particles with a solvent, a grafting agent and a catalyst wherein said solvent is tetrahydrofuran and said catalyst is N,N-dicyclohexylcarbodimide;

forming said PTC composition into a PTC element; and cross-linking said crystalline polymer in said PTC element.

2. The method according to claim 1, wherein said grafting agent is at least one of a 4,4 azobis-4-cyanopentanoic and 2,2-azobis-2-cyano-propanol.

3. A PTC element produced according to the process of claim 1.

4. A PTC element produced according to the process of claim 2.

* * * * *